United States Patent
Friedman et al.

(10) Patent No.: US 10,467,682 B2
(45) Date of Patent: *Nov. 5, 2019

(54) SYSTEMS AND METHODS FOR UTILIZING VEHICLE CONNECTIVITY IN ASSOCIATION WITH PAYMENT TRANSACTIONS

(71) Applicant: MASTERCARD INTERNATIONAL INCORPORATED, Purchase, NY (US)

(72) Inventors: Michael J. Friedman, Stamford, CT (US); Charles Sangwon Lee, Briarcliff Manor, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 51 days.

This patent is subject to a terminal disclaimer.

(21) Appl. No.: 15/371,494

(22) Filed: Dec. 7, 2016

(65) Prior Publication Data
US 2017/0161820 A1    Jun. 8, 2017

Related U.S. Application Data

(60) Provisional application No. 62/264,203, filed on Dec. 7, 2015, provisional application No. 62/312,157, filed on Mar. 23, 2016.

(51) Int. Cl.
*G06Q 30/06* (2012.01)
*G06Q 20/38* (2012.01)
(Continued)

(52) U.S. Cl.
CPC ....... *G06Q 30/0635* (2013.01); *G06Q 20/322* (2013.01); *G06Q 20/36* (2013.01); *G06Q 20/382* (2013.01); *G06Q 20/40* (2013.01)

(58) Field of Classification Search
CPC .................................. G06Q 30/06–08
(Continued)

(56) References Cited

U.S. PATENT DOCUMENTS 9,391,988 B2    7/2016   Cronin
9,442,888 B2    9/2016   Stanfield et al.
(Continued)

FOREIGN PATENT DOCUMENTS

CN    103186872 A    7/2013
EP    2 228 270 A1    9/2010
(Continued)

OTHER PUBLICATIONS

Reasons to Encrypt Your DataMay 22, 2013, Serge Malenkovich, available at: https://www.kaspersky.com/blog/encrypt-your-data/1889 (Year: 2013).*

(Continued)

*Primary Examiner* — Ming Shui
(74) *Attorney, Agent, or Firm* — Harness, Dickey & Pierce, P.L.C.

(57) ABSTRACT

Disclosed are exemplary embodiments of systems and methods for utilizing vehicle connectivity to facilitate payment account transactions. One exemplary method includes, in response to a detected interest of a consumer, requesting sales data associated with the consumer interest from at least one merchant based on a location of a vehicle associated with the consumer, and creating an order object for a product selected from the sales data. The method also includes appending a vehicle signature, for the vehicle, to the order object, and matching the order object to a transaction object for the selected product based on the vehicle signature. The method further includes transmitting a purchase order to the at least one merchant based on the order object and the transaction object, thereby permitting the at least one mer-
(Continued)

chant to facilitate a payment account transaction for the selected product.

16 Claims, 3 Drawing Sheets

(51) Int. Cl.
  *G06Q 20/40* (2012.01)
  *G06Q 20/32* (2012.01)
  *G06Q 20/36* (2012.01)

(58) Field of Classification Search
  USPC .............................................. 705/26.1–27.2
  See application file for complete search history.

(56) References Cited

U.S. PATENT DOCUMENTS

| | | | |
|---|---|---|---|
| 9,775,044 | B2 | 9/2017 | Jangi |
| 2002/0004783 | A1 | 1/2002 | Paltenghie et al. |
| 2004/0172541 | A1 | 9/2004 | Ando et al. |
| 2006/0176146 | A1 | 8/2006 | Krishan et al. |
| 2008/0221743 | A1 | 9/2008 | Schwarz et al. |
| 2008/0238723 | A1* | 10/2008 | Fein .................. G06O 30/0244 340/988 |
| 2009/0313687 | A1* | 12/2009 | Popp ..................... H04L 9/3228 726/9 |
| 2010/0233957 | A1 | 9/2010 | Dobosz |
| 2010/0280956 | A1 | 11/2010 | Chutorash et al. |
| 2011/0238476 | A1 | 9/2011 | Carr et al. |
| 2012/0290472 | A1 | 11/2012 | Mullen et al. |
| 2013/0339165 | A1 | 12/2013 | Calman |
| 2014/0131432 | A1 | 5/2014 | Chang |
| 2014/0180854 | A1* | 6/2014 | Bryant, II ............ G06Q 20/401 705/21 |
| 2014/0180959 | A1 | 6/2014 | Gillen et al. |
| 2014/0207312 | A1 | 7/2014 | Rouyer et al. |
| 2015/0113616 | A1 | 4/2015 | Sampas |
| 2015/0120472 | A1 | 4/2015 | Aabye et al. |
| 2015/0121510 | A1 | 4/2015 | Gauteron et al. |
| 2016/0071082 | A1 | 3/2016 | Driscoll et al. |
| 2016/0224776 | A1 | 8/2016 | Leow |
| 2017/0116600 | A1 | 4/2017 | Sharan |
| 2018/0260882 | A1 | 9/2018 | Friedman et al. |
| 2018/0342001 | A1 | 11/2018 | Chavarria |

FOREIGN PATENT DOCUMENTS

| | | |
|---|---|---|
| JP | 2000-029840 A | 1/2000 |
| WO | WO2006/094048 | 9/2006 |
| WO | WO2008/147457 | 12/2008 |
| WO | WO2009/042392 | 4/2009 |
| WO | WO2011/028874 | 3/2011 |
| WO | WO2015/016929 | 2/2015 |

OTHER PUBLICATIONS

U.S. Appl. No. 15/606,075, filed May 26, 2017, Pedro Chavarria.
U.S. Appl. No. 15/205,664: Office Action dated Dec. 6, 2016 issued in U.S. Appl. No. 15/205,664. The instant application has common subject matter as the instant application and the same Applicant, Mastercard International Incorporated.
U.S. Appl. No. 15/205,664: Office Action dated Mar. 22, 2017 issued in U.S. Appl. No. 15/205,664. The instant application has common subject matter as the instant application and the same Applicant, Mastercard International Incorporated.
U.S. Appl. No. 15/205,664: Notice of Allowance dated May 31, 2017 issued in U.S. Appl. No. 15/205,664. The instant application has common subject matter as the instant application and the same Applicant, Mastercard International Incorporated.
PCT International Search Report and Written Opinion (6 pages) of PCT Patent Application No. PCT/US2016/041511, dated Oct. 18, 2016, which has common subject matter as the instant application and the same Applicant, Mastercard International Incorporated. As a note, the Japanese cited document is not in the English language. *A machine translation from the Japanese Patent Office is provided simply for convenience to the Examiner.*
U.S. Appl. No. 15/977,660: Office Action dated Jul. 19, 2018 issued in U.S. Appl. No. 15/977,660. U.S. Appl. No. 15/977,660 is a continuation of the instant application.

* cited by examiner

SYSTEMS AND METHODS FOR UTILIZING VEHICLE CONNECTIVITY IN ASSOCIATION WITH PAYMENT TRANSACTIONS

CROSS-REFERENCE TO RELATED APPLICATIONS

This application claims the benefit of, and priority to, U.S. Provisional Application No. 62/264,203, filed Dec. 7, 2015, and U.S. Provisional Application No. 62/312,157, filed Mar. 23, 2016. The entire disclosure of each of the above applications is incorporated herein by reference.

FIELD

The present disclosure generally relates to systems and methods for utilizing vehicle connectivity in association with payment account transactions. More particularly, the present disclosure relates to systems and methods for facilitating payment account transactions based on vehicle signatures, and potentially, further, for accessing payment account credentials, delivering advertising content, providing vehicle access, and/or to enabling merchant payments based thereon.

BACKGROUND

This section provides background information related to the present disclosure which is not necessarily prior art.

Products (e.g., goods, services, etc.) are known to be offered for sale, and to be sold, by merchants. In connection therewith, consumers are known to purchase products from the merchants through payment accounts. Separately, consumers are also known to travel in vehicles to the merchants to purchase products, and/or to other locations. Typically, the merchants are located along the consumers' routes of travel to those locations, and the vehicles are known to include functionality to guide the consumers to those locations (i.e., navigation). Further, network connectivity has extended to such vehicles, for example, in the form of road side assistance features and network access for mobile devices in proximity to, or within, the vehicles.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Consumers often use payment accounts to fund transactions for products at merchants (e.g., for goods, services, etc.). In performing such transactions, interactions between the consumers and the merchants may vary depending on, for example, relative locations of the consumers and merchants (e.g., in person interactions, virtual interactions, etc.), types of payment accounts involved, types of products being purchased, etc. Uniquely, the systems and methods herein provide for interactions between consumers and merchants through vehicles associated with the consumers (e.g., through vehicle connectivity of such vehicles and using signatures associated with such vehicles, etc.). In particular, a decision engine may be provided, which, in response to a detected interest of a consumer (i.e., a known or potential interest), requests sales data related to the interest from one or more merchants and then provides the sales data to the consumer at the vehicle. The consumer may then be able to view, browse, and select a product from the sales data, through the vehicle, for example, whereby the selection is provided back to the decision engine, and also to a transaction engine. The decision engine creates an order object (e.g., including a product identifier/description, etc.), which includes a vehicle signature from the vehicle, and separately, the transaction engine creates a transaction object (e.g., including payment account credentials, etc.), which also includes the vehicle signature from the vehicle. The order object and the transaction object are then brought together and compared. If the vehicle signatures match in the two objects (and/or, potentially, match a reference vehicle signature), then a purchase order for the product selected by the consumer is transmitted to the merchant (e.g., by the decision engine and/or the transaction engine, etc.), which in turn acts to facilitate a payment account transaction for the product (e.g., based on the payment account credentials included in the transaction object, etc.). In this manner, the vehicle signature provides a basis for authentication of the request for the purchase of the product, thereby improving security and/or fraud protection related to the ultimate payment account transaction for the product, and may further provide a basis for identifying and/or invoking one or more loyalty/rewards programs (or value-added service(s)) for the payment account transaction.

Figure 1:
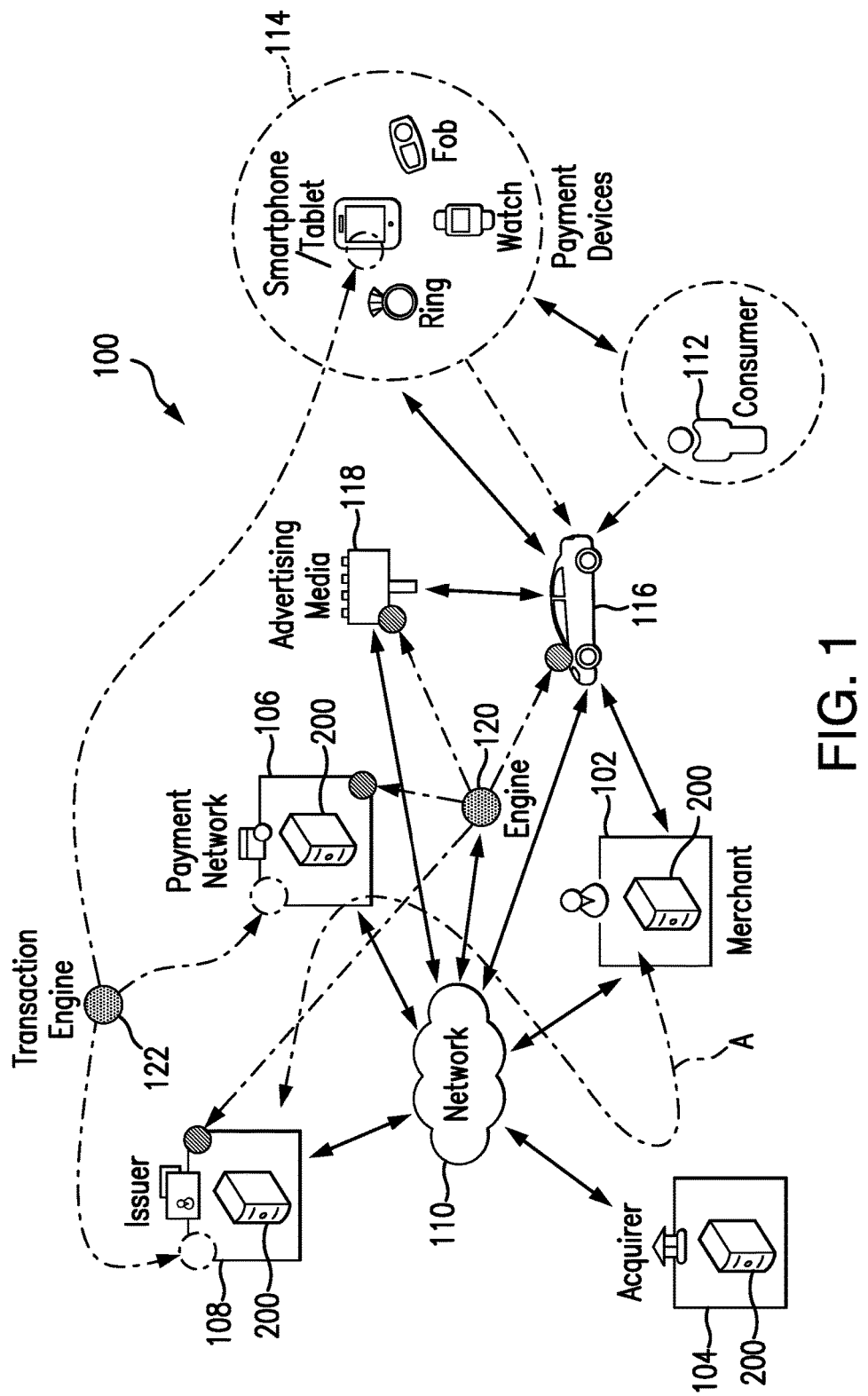
FIG. 1 is a block diagram of an exemplary system of the present disclosure suitable for utilizing vehicle connectivity, and vehicle signatures associated with corresponding vehicles, in association with payment account transactions.

FIG. 1 illustrates an exemplary system 100, in which one or more aspects of the present disclosure may be implemented. Although, in the described embodiment, the system 100 is presented in one arrangement, other embodiments may include the system 100 arranged otherwise, depending, for example, on processing of payment account transactions, connectivity associated with vehicles, types of vehicle signatures utilized, etc.

Referring to FIG. 1, the system 100 generally includes, in connection with facilitating payment account transactions, a merchant 102, an acquirer 104 associated with the merchant 102, a payment network 106, and an issuer 108 configured to issue payment accounts to consumers, each of which is coupled to network 110. The network 110 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, the network 110 includes multiple networks, where different ones of the multiple networks are accessible to different ones of the illustrated parts in FIG. 1. In this example, the network 110 may include a private payment transaction network made accessible by the payment network 106 to the acquirer 104 and the issuer 108 and, separately, a public network (e.g., the Internet, etc.) through which the merchant 102 and the acquirer 104, and/or other parts of the system 100 (e.g., a vehicle 116, etc.), may communicate (e.g., via network-based applications, etc.).

In the system 100, the merchant 102 offers products (e.g., goods and/or services, etc.) for sale to consumers, such as consumer 112. As shown in FIG. 1, the consumer 112 is associated with multiple different payment devices, generally indicated at 114, that can be used in connection with purchasing products from the merchant 102. Specifically in FIG. 1, the consumer 112 is associated with payment devices 114 that include: a smartphone/tablet (broadly, a computing device, etc.), a fob payment device (e.g., a key fob for the vehicle 116, etc.), a jewelry payment device (e.g., a near-field communication (NFC) enabled ring, etc.), and a wristband payment device (e.g., a smartwatch, another watch, a FitBit™ wristband, a Nymi™ wristband, etc.). It should be appreciated that the payment devices 114 associated with the consumer 112 may include other devices such as, for example, payment cards, or other mobile, wearable, or carry-able devices or accessories that can be suited or configured to communicate with one or more point-of-sale (POS) terminals (e.g., wireless network enabled, (e.g., NFC enabled, Bluetooth enabled, etc.), etc.) and employed as payment devices as described herein. It should further be understood that, while not specifically referenced as a payment device 114, the vehicle 116 included in the system 100 may also be understood to be a payment device when, or if, configured and/or provisioned by the appropriate network-based application(s) (e.g., in a similar manner to the illustrated smartphone/tablet payment device 114, etc.). With that said, each of the payment devices 114 (including the vehicle 116, when appropriate) may be provisioned with payment account credentials as associated with at least one payment account for the consumer 112, such that the payment devices 114 each include a primary account number (PAN) for the consumer's payment account, a token associated with the payment account, and/or any other indicia associated with or identified to the consumer's payment account. In addition, the payment devices 114 may be independently powered (e.g., such as the wristband/watch or smartphone/table, etc.), or powered when disposed in proximity to a point-of-sale (POS) terminal (e.g., such as the ring, etc.).

When the consumer 112 uses the smartphone/tablet (or potentially one of the other payment devices 114), or another mobile computing device, as a payment device 114, it should be appreciated that the smartphone/tablet (or other computing device or other payment device 114) includes one or more network-based applications configured to enable the smartphone/tablet to be a payment device (broadly, a transaction engine 122, or part thereof, as described hereinafter). Exemplary network-based applications include electronic wallet, or e-wallet (or virtual wallet), applications such as, for example, Masterpass® from MasterCard, Apple Pay® from Apple, Samsung Pay® from Samsung, etc., or other applications related to and/or interacting with the merchant 102 (or other merchants), the payment network 106, and/or the issuer 108. In addition, as indicated above, and similar to the smartphone/tablet, the vehicle 116 may also include one or more network-based applications (which may be the same as included in the smartphone/tablet or different (again broadly, a transaction engine 122, or part thereof)) configured to enable the vehicle 116 to be a payment device.

In a general exemplary transaction in the system 100 between the consumer 112 and the merchant 102, the consumer 112 may present one of the payment devices 114 (e.g., the key fob payment device in this example, etc.) to the merchant 102, for example, at a POS terminal. In turn, the POS terminal (broadly, the merchant 102) receives, via contact or contactless communication with the key fob (e.g., via NFC, Bluetooth, RFID, etc.), for example, a token or other credential associated with the consumer's payment account associated with the key fob (or another payment account associated with the key fob) and then communicates an authorization request (e.g., including the payment account token and an amount of the purchase, etc.) to the acquirer 104. The authorization request is transmitted along path A in the system 100, as referenced in FIG. 1. The acquirer 104 communicates the authorization request with the issuer 108, through the payment network 106, such as, for example, through MasterCard®, VISA®, Discover®, American Express®, etc., to determine whether the payment account is in good standing and whether there is sufficient funds and/or credit to cover the transaction. In turn, if approved, an authorization reply (indicating the approval of the transaction) is transmitted back from the issuer 108 to the merchant 102, along path A, thereby permitting the merchant 102 to complete the transaction. The transaction is later cleared and/or settled by and between the merchant 102, the acquirer 104, and the issuer 108. If declined, however, the authorization reply (indicating a decline of the transaction) is provided back to the merchant 102, along path A, thereby permitting the merchant 102 to halt or terminate the transaction, or request alternative forms of payment.

Transaction data is generated, collected, and stored as part of the above exemplary interactions among the merchant 102, the acquirer 104, the payment network 106, the issuer 108, and the consumer 112. The transaction data includes a plurality of transaction records, one for each transaction, or attempted transaction. The transaction records, in this exemplary embodiment, are stored at least by the payment network 106 (e.g., in a data structure associated with the payment network 106, etc.), but could be stored in other parts of the system 100 and transmitted there between as needed or requested.

Figure 2:
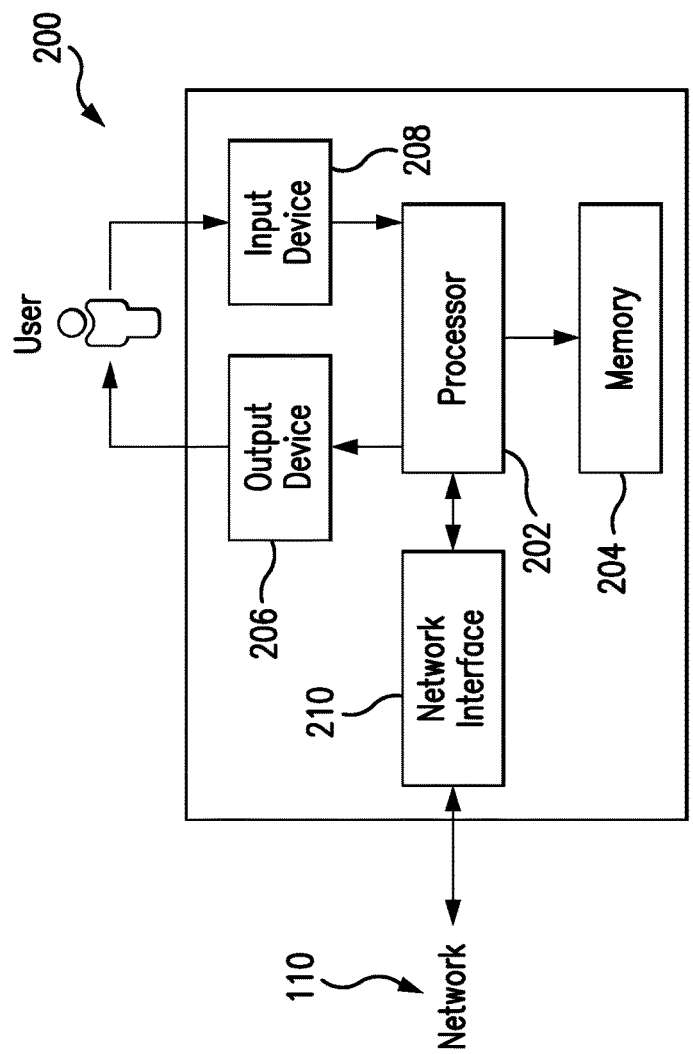
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, computers, on-board vehicle computers, tablets, laptops, smartphones, PDAs, fobs, fitness tracking wristbands, POS terminals, vehicles, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the merchant 102, the acquirer 104, the payment network 106, and the issuer 108 are illustrated as including, or being implemented in, computing device 200, coupled to the network 110. In addition in the exemplary embodiment of FIG. 1, various ones of the consumer's payment devices 114 (e.g., the smartphone/tablet, etc.), the vehicle 116, and advertising media 118 (which will be described in more detail hereinafter) may be considered computing devices consistent with computing device 200. However, the system 100 should not be considered to be limited to the computing device 200, as described below, as different computing devices and/or arrangements of computing devices may be used. In addition, different components and/or arrangements of components may be used in other computing devices.

The exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, payment account information (e.g., tokens, PANs, or other payment credentials, etc.), consumer information (e.g., names, addresses, content information, vehicle signatures, vehicle access credentials, etc.), advertising content (e.g., ads, offers, coupons, etc.), merchant information (e.g., merchant names, merchant IDs, product prices, merchant/product locations, etc.), and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In the exemplary embodiment, the computing device 200 includes an output device 206 that is coupled to (and is in communication with) the processor 202. The output device 206 outputs information, either visually or audibly, to a user of the computing device 200, such as, for example, the consumer 112 in the system 100 when at or using one of the payment devices 114, when in or near the vehicle 116, or when viewing the advertising media 118, etc. It should be further appreciated that various interfaces (e.g., as defined by network-based applications, etc.) may be displayed at computing device 200, and in particular at output device 206, to display such information. With that said, the output device 206 may include, without limitation, a liquid crystal display (LCD), a light-emitting diode (LED) display, an LED, an organic LED (OLED) display, an "electronic ink" display, speakers, or any other device suitable to output information to the user, etc.

The computing device 200 also includes an input device 208 that receives inputs from the user (i.e., user inputs) such as, for example, selection of a payment device and/or payment account, etc. The input device 208 is coupled to (and is in communication with) the processor 202 and may include, for example, a keyboard, a pointing device, a mouse, a button, a stylus, a touch sensitive panel (e.g., a touch pad or a touch screen, etc.), a sensor (or a sensor array) (e.g., to detect engine sounds/vibrations, etc.), an RFID reader, another computing device, and/or an audio input device. Further, in various exemplary embodiments, a touch screen, such as that included in a tablet, a smartphone, a vehicle dash, or similar device, behaves as both an output device and an input device. In at least one embodiment, a computing device may omit the output device 206 and/or the input device 208.

In addition, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth adapter, a Wi-Fi adapter, etc.), a mobile network adapter, or other device capable of communicating to/with one or more different networks, including the network 110. In one example, the network interface 210 includes an RFID reader/interface, etc. Further, in some exemplary embodiments, the computing device 200 includes the processor 202 and one or more network interfaces 210 incorporated into or with the processor 202.

With reference again to FIG. 1, the system 100 includes the vehicle 116. As described, the vehicle 116 is consistent, at least in part, with the computing device 200. While illustrated as a car, the vehicle 116 may include any type of vehicle such as, for example, a car, a motorcycle, a bus, a train, a boat, a subway vehicle, etc. In addition, the vehicle 116 may belong to the consumer 112 or an associate of the consumer 112 (e.g., a friend, an employer, etc.), or the consumer 112 may be associated with the vehicle 116 in one or more other ways (e.g., where the vehicle 116 is a rental vehicle, etc.) whereby the consumer 112 may be the driver of the vehicle or simply a passenger in the vehicle 116 but not the owner of the vehicle 116 (and/or, for example, where the vehicle is shared with other users, etc.). Alternatively, or additionally, the vehicle 116 may be associated with a third party, such as a taxi company, a car service, bus line, mass transit operator, etc., again, whereby the consumer 112 may be, for example, a passenger in the vehicle 116.

In the exemplary embodiment, the vehicle 116 is associated with a vehicle signature, which is unique, or at least semi-unique, to the vehicle 116.

The vehicle signature may include a profile representative of a sound and/or a vibration associated with the vehicle 116. For example, the vehicle 116 may include a motor or other component drive device, which is configured to propel the vehicle 116 in a direction of travel, for example, along a road, street, highway, track, etc. As the motor operates (i.e., as the vehicle 116 is running), in this example, it provides a substantially unique or semi-unique sound and/or vibration, which is sufficient to distinguish the vehicle 116 from multiple other vehicle (i.e., semi-unique) or from all other vehicles (i.e., unique) Likewise, other parts of the vehicle 116 may generate sound and/or vibration while the vehicle 116 is in use, which may be unique or semi-unique to the vehicle 116. Further, the sound and/or vibration may be unique to a feature or part of a vehicle (e.g., the sound of a 6-cylinder motor versus the sound of an 8-cylinder motor, versus the sound of an electric vehicle (e.g., a power converter, etc.); the sound of a 6 cylinder motor in a Honda® vehicle versus the sound of a 6 cylinder motor in a Mercedes® vehicle; etc.), whereby the sound and/or vibration is consistent with certain other vehicles, but still distinct from others (i.e., semi-unique). The vehicle signature may be based on, representative of, or corresponding to any of the above described sounds or vibrations. As another example, the vehicle signature may be associated with audible tones generated by other sources within the vehicle 116 (e.g., the radio, an audible output device specifically associated within the vehicle 116 to produce such vehicle signature, another output device of the vehicle 116, etc.), either when the vehicle 116 is running or not. Again, the audible tones may be unique or semi-unique to the vehicle 116. Further, the vehicle signature, when including such a sound and/or vibration profile, may further be specific to one or more conditions of the vehicle and/or environments of the vehicle (e.g., temperature, humidity, season, etc.).

In the illustrated embodiment, the vehicle 116 also generally includes gauges and/or sensors indicating conditions of the vehicle 116 (e.g., mileage, fuel level, oil level, etc.), or indicating environmental conditions (e.g., temperature, humidity, etc.). In connection therewith, the vehicle signature may be generated based on (or based at least in part on) such conditions. For example, the vehicle signature may include a gasoline level, an oil service life, an A/C setting, a battery level, a tire pressure, a speed, a mileage, etc., or the same subject to an operator (e.g., a shift function, a multiplier, a token generator, and/or other suitable algorithm, etc.), etc. And, the vehicle signature may further include a numeric or alpha-numeric number associated with the vehicle 116, such as, for example, a vehicle identification number (VIN), a license plate number, (or other identifier, etc.) associated with the vehicle 116, or the VIN (and/or license plate number) subject to an operator (e.g., a shift function, a multiplier, a token generator, and/or other suitable algorithm, etc.). As apparent from the above, in certain examples, the vehicle signature may be dynamic or variable, whereby it is changed at one or more regular or irregular intervals. For example, when the vehicle signature is based on the VIN, the shift function, multiplier or token generator may be altered each month (or provided with a new seed), so that the vehicle signature (even though based on the VIN) changes each month, or at some other interval (e.g., to provide security, etc.). Additionally, or alternatively, the vehicle signature may change as the condition of the vehicle 116 changes. In the above example, a vehicle signature based on the mileage will continue to change as the vehicle 116 accumulates miles (without alteration of any algorithms associated therewith).

In various embodiments, the vehicle 116 itself is configured to generate the vehicle signature (e.g., determine, calculate, record, etc.), and further includes a transmitter (e.g., output device 206, etc.) and/or transceiver (e.g., combination of output device 206 and input device 208, or network interface 210, etc.), which emits the vehicle signature. The transmitter/transceiver may transmit and/or emit the vehicle signature as represented by any suitable form of wireless signal via the network 110, and/or via Bluetooth, NFC, RFID, etc. When the vehicle signature is a physical feature of the vehicle 116 (e.g., a sound and/or vibration therefrom, etc.), the vehicle 116 may rely on its inherent operation to emit the vehicle signature, or may record or otherwise capture the vehicle signature (via the input device 208, etc.) and then transmit the same in response to a particular request. Consequently, given the proper receiver (e.g., input device 208, network interface 210, etc.) and/or sensor, an entity (e.g., in proximity with the vehicle 116 or otherwise, etc.) is able to receive the vehicle signature and to potentially identify the vehicle 116 based on the vehicle signature (e.g., via the identifier associated with the vehicle 116 and/or the motor sound/vibration of the vehicle 116, etc.), or at least confirm the vehicle 116 is consistent with the vehicle signature. That said, the vehicle 116 may be configured to transmit the vehicle signature via the network 110, for example, to the issuer 108, in response to a request, whereby the issuer 108 is not required to "capture" the vehicle signature (but instead, merely receives it, via network interface 210, for example), etc.

In various embodiments, the vehicle 116 may further operate as a payment device (as described above), consistent with the payment devices 114, or as a mechanism for authentication of the payment device 114 that is actually used (and/or as a mechanism for authenticating the consumer 112). In such embodiments, the vehicle signature would be known apart from the vehicle 116 to permit verification of the vehicle signature, by, for example, the merchant 102, the payment network 106, the issuer 108, and/or the payment device 114, etc., or would be separately provided to the merchant 102, the payment network 106, and/or the issuer 108, etc. (broadly, as a reference vehicle signature). Specifically, for example, the consumer 112 may pair the vehicle 116 with a payment token for his/her payment account, whereby the vehicle signature for the vehicle 116 is captured, received, stored, and/or recorded (apart from the vehicle 116) so that the vehicle signature may be recalled (as a reference) for comparison to facilitate purchases (when the payment token in used) and/or to authenticate the one of the other payment devices 114 (or the vehicle 116) being used. As such, in this example, when the vehicle signature received and/or captured at the outset of a transaction (where the vehicle 116 or one of the other payment devices 114 is used to perform the transaction) matches a reference vehicle signature stored in the payment network 106, the issuer 108 and/or the payment device 114, the vehicle 116, the payment device 114, and/or the consumer 112 is thereby authenticated. In general, when the vehicle signature is dynamic, one or more bases for the dynamic nature of the vehicle signature (e.g., a shift function, algorithm, mileage or temperature of the vehicle 116, etc.) is stored for recall and/or is accessible to a decision engine 120 for use as described herein (e.g., in connection with such authentication, etc.).

With continued reference to FIG. 1, the system 100 also includes the advertising media 118 configured to display advertising content. As shown, the advertising media 118 is a dynamic billboard that may be positioned proximate to a road, highway, interstate, waterway, train route, etc., by which the vehicle 116 passes when traveling. While illustrated as a billboard, it should be appreciated that the advertising media 118 may include a variety of other media types, which may be viewed or otherwise perceived by the consumer 112 while in transit in the vehicle 116, or while walking, etc. The advertising content at the advertising media 118 may be generic, or it may be specifically related or directed to the consumer 112, as the consumer 112 and/or vehicle 116 approaches the advertising media 118. For example, the advertising content may relate to data stored (e.g., favorites, etc.) at the consumer's smartphone/tablet, to data associated with prior payment account transactions of the consumer 112 using one or more of the consumer's payment accounts (e.g., as stored at the payment network 106, etc.), etc. As shown, the advertising media 118 is coupled to the network 110, and the advertising media 118 may be configured to display, change, etc., content as described herein (e.g., in response to detecting or receiving a vehicle signature of vehicle 116, etc.). As described, the advertising media 118, in this exemplary embodiment, is consistent with the computing device 200. In some embodiments, advertising media 118 may further be configured to incorporate and/or communicate with output device(s) 206 within or associated with the vehicle 116, or at the consumer's smartphone/tablet, etc.

In this exemplary embodiment, the system 100 further includes the decision engine 120, which is specifically configured, by executable instructions, to perform one or more of the operations described herein. As indicated by the dotted lines in FIG. 1, the decision engine 120 is located in whole, or in part, in the payment network 106, the issuer 108, the vehicle 116, and/or the advertising media 118 (and/or, in some embodiments, in the smartphone/tablet payment device 114). Specifically, for example, the decision engine 120 may include multiple decision engines 120, with each separate decision engine 120 located within one of the payment network 106, the issuer 108, the vehicle 116, and/or the advertising media 118 (or even a payment device 114, etc.). These separate decision engines 120 may then work together and/or cooperate to operate as the decision engine 120, while continuing to be separate, as described herein. It should be appreciated that the decision engine 120 may be located in whole or in part, and/or associated, otherwise in other embodiments.

Still further, the system 100 includes a transaction engine 122, which is also specifically configured, by executable instructions, to perform one or more of the operations described herein. As indicated by the dotted lines in FIG. 1, the transaction engine 122 is located in whole, or in part, in the payment network 106, the issuer 108, and/or the smartphone/tablet payment device 114 (and/or, in some embodiments, in the vehicle 116). For example, the transaction engine 122 may include multiple transaction engines 122, with each separate engine 122 located within one of the payment network 106, the issuer 108, and/or the smartphone/tablet payment device 114 (or even the vehicle 116). These separate transaction engines 122 may then work together and/or cooperate to operate as the transaction engine 122, while continuing to be separate, as described herein. Specifically, for example, the network-based wallet application (e.g., e-wallet or virtual wallet) (referred to above) may be usable by the consumer 112, at the smartphone/tablet payment device 114, based on cooperation and/or interaction between a transaction engine 122 at the issuer 108 (or payment network 106) and a transaction engine 122 at the smartphone/tablet payment device 114 (such that the wallet application may be considered the sum of multiple parts). It should further be appreciated that the transaction engine or engines 122 may be located in whole or in part, and/or associated, otherwise in other embodiments.

Further, while the decision engine 120 and the transaction engine 122 are illustrated as separate parts of the system 100 in FIG. 1, it should be appreciated that the decision engine 120 and transaction engine 122 may be (wholly or partially) integrated, whereby the decision engine 120 and the transaction engine 122 may be included in the payment network 106, the issuer 108, etc. (e.g., in at least one computing device (e.g., in at least one server, etc.), etc.). This, however, would not preclude additional decision engines 120 and/or transaction engines 122 from being located in the vehicle 116 and the smartphone/tablet, respectively, for example, whereby the functionality described herein may be enabled.

At the outset, the decision engine 120 and/or the transaction engine 122 is configured to register the vehicle 116 to enable one or more of the operations described herein. In particular, for example, as part of the registration, the decision engine 120 and/or the transaction engine 122 is configured to receive a vehicle signature for the vehicle 116 and store the vehicle signature as a reference vehicle signature (e.g., in memory 204, etc.) for use as described below. The registration, for example, may include installing and/or activating the decision engine 120 at the vehicle 116 (as a network-based application), or through installing and/or activating one or more other network-based applications at the vehicle 116 and/or smartphone payment device 114 (e.g., Fordpass® application, myAudi® application, etc.).

In connection therewith, the vehicle signature (for use as the reference vehicle signature) may be received from the vehicle 116 (e.g., in the manner described above, etc.) (as an operation of the decision engine 120 included therein) and/or the reference vehicle signature may be received from the merchant 102, the smartphone/tablet payment device 114, and/or any other device suitable to collect the vehicle signature (depending on the type of vehicle signature and/or the type of available input devices (e.g., microphone, etc.)) and communicate the vehicle signature to the decision engine 120 and/or the transaction engine 122. Further, the decision engine 120 and/or the transaction engine 122 may be configured to receive and store the vehicle signature for the vehicle 116 at one or more regular intervals (e.g., daily, weekly, monthly, quarterly, etc.) or irregular intervals (e.g., in connection with a last transaction by the consumer 112 involving the vehicle signature, etc.), depending, for example, again on a form of the vehicle signature, etc. The interval(s) at which the vehicle signature is updated may be based, in whole or in part, for example, on the type of vehicle signature (e.g., dynamic versus static, etc.), the ease/difficulty of updating the vehicle signature, and/or the tolerance associated with "sufficiently match" as described below, etc.

In general in the system 100, the decision engine 120 is configured to receive a detected interest of the consumer 112 (i.e., a known or potential interest) (e.g., from an application within the smartphone/tablet payment device 114, from an application within another payment device, from a location and/or condition of the vehicle 116, from a user input, from transaction history for the consumer 112, etc.). In response, the decision engine 120 is configured to identify one or more relevant merchants based on the interest of the consumer 112, and further configured to request or retrieve sales data from the identified merchant(s) (e.g., merchant 102 in the following description, etc.). The sales data may include, without limitation, pricing for one or more products relating to the detected interest of the consumer 112, corresponding inventory, etc. The decision engine 120 is configured to then pass the sales data from the merchant 102 to the vehicle 116, where it is displayed to the consumer 112 (e.g., at the vehicle 116, at the smartphone/tablet payment device 114, etc.). And, when the consumer 112 selects a product for purchase from the merchant 102, at the vehicle 116 (based on the displayed sales data), for example, the decision engine 120 is configured, in response to the selected product, to create an order object for the product. In connection therewith, the decision engine 120 is configured to also request the vehicle signature from the vehicle 116 and to append the vehicle signature to the order object. In so doing, the decision engine 120 may also be configured to authenticate/verify the vehicle signature received from the vehicle 116 based on a reference vehicle signature for the vehicle 116, for example, stored in memory 204 in association with the decision engine 120, etc. When the received vehicle signature matches, or sufficiently matches (as described herein) the reference vehicle signature, the vehicle signature is authenticated/verified (and may then be appended to the order object). It should be appreciated, however, that such authentication/verification of the vehicle signature is not required in all embodiments.

In addition, after the product is selected by the consumer 112, and the selection is provided to the transaction engine 122 (e.g., by the vehicle 116, etc.), the transaction engine 122 is configured to create a transaction object for the purchase of the selected product from the merchant 102. The transaction object includes, without limitation, an amount of the potential transaction, payment account credentials for the consumer 112, etc. Further, the transaction engine 122 is configured to also request the vehicle signature from the vehicle 116 and to append the vehicle signature to the transaction object. In so doing, the transaction engine 122 may also be configured to authenticate/verify the vehicle signature received from the vehicle 116 based on a reference vehicle signature for the vehicle 116, for example, stored in memory 204 in association with the transaction engine 122, etc. When the received vehicle signature matches, or sufficiently matches (as described herein) the reference vehicle signature, the vehicle signature is authenticated/verified (and may then be appended to the transaction object). It should be appreciated, however, that such authentication/verification of the vehicle signature is not required in all embodiments.

In this exemplary embodiment, the transaction engine 122 is configured to then provide the transaction object to the decision engine 120. In turn, the decision engine 120 is configured to match the order object with the received transaction object, based on the vehicle signature for the vehicle 116 (and, potentially, further match the vehicle signature to the reference vehicle signature). When a match is determined (e.g., when the vehicle signatures included in the order object and the transaction object are the same, when all three vehicle signatures match (or sufficiently match) (taking into account the reference vehicle signature), etc.), the decision engine 120 is configured to transmit a purchase order to the merchant 102 for the selected product, where the purchase order is based on the order object and the transaction object (e.g., includes a combination of information from the matched order object and transaction object, etc.). The merchant 102, in response, may be configured to further authenticate/verify the vehicle signature as included in the purchase order received from the decision engine 120, based on a reference vehicle signature for the vehicle 116, for example, stored in memory 204 of the computing device 200 associated with the merchant 102, etc. When the received vehicle signature matches, or sufficiently matches (as described herein), the reference vehicle signature, the vehicle signature is authenticated/verified, and the merchant 102 is then configured to communicate an authorization request for the transaction to the issuer 108, as described above (and consistent with path A in FIG. 1), and further facilitate delivery of the product to the consumer 112. It should be appreciated, however, that such authentication/verification of the vehicle signature is not required in all embodiments.

In various embodiments, in connection with transmitting the purchase order to the merchant 102, the decision engine 120 may be configured to determine a loyalty/rewards program association between the consumer 112 and one or more of the relevant merchants, prior to identifying the merchant(s) based on an indicated interest of the consumer 112. Specifically for example, when an application, consumer input, and/or condition of the vehicle 116, etc., for example, indicates a consumer interest, and the interest is associated with a vehicle signature, the decision engine 120 may be configured to detect the consumer interest and/or identified specific merchant 102, based on the loyalty/rewards program (e.g., select the particular merchant 102 at which the consumer 112 has a loyalty account, etc.). Additionally, or alternately, the decision engine 120 and/or transaction engine 122 may identify a loyalty/rewards program based on the vehicle signature included in a respective one of the order object and the transaction object, whereby the engine 120/122 is configured to identify the transaction to the loyalty/rewards program and include account detail for the loyalty/rewards program in one of the objects (or in the purchase order), so that points, miles, etc., may be accumulated. More generally, the vehicle signature may be employed, by the decision engine 120 and/or the transaction engine 122, to identify merchants and/or products to the consumer 112 and/or facilities transactions so that the consumer 112 is able to earn points, miles, etc. to the loyalty/rewards program.

In various embodiments, the decision engine 120 may be configured to also authenticate the payment device 114 and/or the consumer 112 in connection with the transaction (e.g., as described above using the vehicle signature for the vehicle or otherwise (e.g., or via a personal identification number (PIN), a biometric, etc.), etc.), and/or to operate as a POS terminal for the merchant 102 to facilitate the transaction for the selected product.

Moreover in the system 100, the decision engine 120 may be configured to permit access to the vehicle 116 by the merchant 102 as directed by the consumer 112 (or other owner/operator of the vehicle 116). For example, the decision engine 120 may be configured to provide access to the vehicle 116, in response to a payment account transaction by the consumer 112 and/or schedule such access in response to the payment account transaction by the consumer 112, thereby enabling fulfillment, by the merchant 102, of the payment account transaction (e.g., delivery of the product(s) selected by the consumer 112, etc.). In particular, when such a transaction for a product occurs, the decision engine 120 may be configured to provide the vehicle signature for the vehicle to the merchant 102 so that the merchant 102 can initially find/identify the vehicle 116 (e.g., match the vehicle signature received from the decision engine 120 to the vehicle signature of the vehicle 116, etc.). Then, when the vehicle 116 is identified, the decision engine 120 may be configured to cause a trunk lid or back gate or door of the vehicle 116 to be opened and/or unlocked, for example, in response to a one-time token from the merchant 102 for the given transaction (which may be based on the vehicle signature for the vehicle 116, or not, and/or based on a scheduled time associated with the transaction). In this manner, the product(s) (e.g., groceries, etc.) may be purchased, as described above (e.g., by a purchase order to the merchant 102, etc.) and delivered to, and then further placed in, the vehicle 116 without the consumer 112 being present for the transaction.

Further in the system 100, the decision engine 120 is configured to identify advertising content (e.g., product offerings, coupons, rebates, specials, etc.) for the consumer 112. In particular, the decision engine 120 is configured to identify advertising content specific to the consumer 112 (e.g., based on detected consumer interests (i.e., known or potential interests of the consumer 112), etc.), for example, based on numerous parameters associated with the consumer 112, the consumer's prior purchase history, and/or the location and/or condition of the vehicle 116, all of which may be contextual in nature or intuitive in nature, which may be indicative of consumer interest in a product and/or merchant. In so doing, the decision engine 120 is configured to collect the above data, including from the consumer 112, the vehicle 116, a network-based application at the consumer's smartphone/table, etc. Contextual parameters, for example, relate to the location of the consumer 112, the location of the vehicle 116, the route of travel of the consumer 112 and/or the vehicle 116, merchants along the route, merchants in close proximity to the consumer 112 and/or the vehicle 116, consumer favorites stored in memory 204 of the smartphone/tablet for which the consumer 112 has provided permissions to share, and/or other conditions of the consumer's location and/or the vehicle's location, etc. Intuitive parameters, conversely, are derived from a prior history of the consumer 112, including, for example, prior travel history, prior transaction history through the consumer's payment account(s), etc. Then, for example, when the advertising media 118 detects and/or receives the vehicle signature for the vehicle 116, from the vehicle 116, the advertising media 118, via the decision engine 120, is configured to display advertising content specific to the consumer 112. It should be appreciated that the decision engine 120 may be further derived by a variety of different advertising contents based on numerous different contextual and intuitive parameters, to thereby further assist the consumer 112 in purchases of products presented to the consumer via the advertising content, by use of the vehicle's connectivity.

In the description above, the vehicle 116 and/or the decision engine 120 are described with reference, generally, to one payment account associated with the consumer 112. In this and other system embodiments, however, other consumers and/or payment accounts may be employed by the vehicle 116, without limitation to the consumer 112 (and without limitation to the particular user(s) operating the vehicle 116, riding in the vehicle 116, etc.).

Specifically, for example, the vehicle 116 may be accessed by and/or used by multiple different users (including the consumer 112) such as, for example, when the vehicle 116 is a rental vehicle, etc. In connection therewith, upon detection of a consumer interest by the vehicle 116 for the consumer 112 (when the consumer 112 is using the vehicle), the decision engine 120 is configured to operate as described above to identify relevant merchants associated with the consumer's identified interest and pass sales data from the merchant(s) to the consumer 112 at the vehicle 116. And, when the consumer 112 selects a desired product (from the sales data), the decision engine 120 is configured to create an order object for the product. In these embodiments, however, when the transaction engine 122 creates the transaction object for the selected product, the transaction engine 122 may be configured to include payment credentials for a payment account associated the vehicle signature of the vehicle 116. In this manner, for a rental car, for example, a rental merchant (who rented the vehicle 116 to the consumer 112) may fund all transactions for gasoline at a particular gasoline merchant, because the rental merchant's payment account is associated with the vehicle signature. Once charged to the rental merchant's payment account, the rental merchant may, in turn, generate a transaction for the consumer's payment account and/or bill the consumer for the charge(s) for the vehicle 116. Of course, other examples are within the scope of the present disclosure, in which a vehicle signature is associated with a particular payment account and/or multiple consumers are able to use a single vehicle (with a single vehicle signature).

As stated above, it should again be appreciated that the decision engine 120 and/or the transaction engine 122 may be included in the payment network 106, the issuer 108, the smartphone/tablet payment device 114, the vehicle 116, and/or the advertising media 118, in whole or in part, to operate as described herein.

Figure 3:
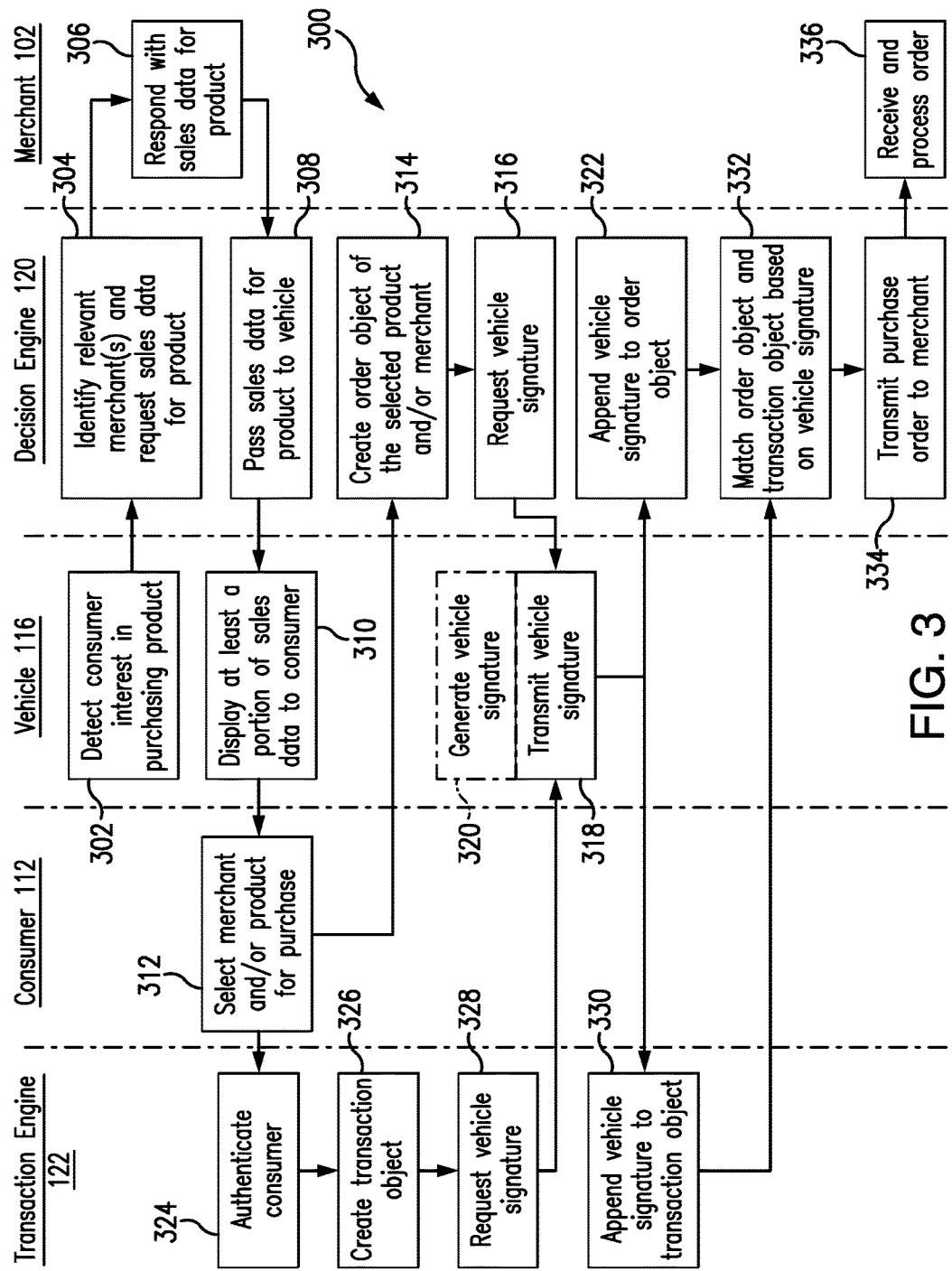
FIG. 3 is a flow diagram of an exemplary method, suitable for use in the system of FIG. 1, for utilizing vehicle connectivity in association with payment account transactions.

FIG. 3 illustrates exemplary method 300 for utilizing vehicle connectivity in association with payment account transactions. The exemplary method 300 is described with reference to the system 100 and the computing device 200. However, the methods herein should not be understood to be limited to the system 100 and/or the computing device 200. Likewise, the systems and device herein should not be understood to be limited to the method 300. In the following description, it is understood further that the consumer 112 is disposed in the vehicle 116, and generally is in transit to one or more locations. It should be appreciated, though, that the method 300 may be subject to other conditions, other vehicles, and/or other consumers (e.g., vehicle passengers, etc.) within the scope of the present disclosure.

As part of the transit/travel of the vehicle 116, the vehicle 116 detects, at 302, an interest associated with the consumer 112 for a product from one or more merchants (e.g., from the merchant 102, etc.). For example, the vehicle 116 may include one or more merchant-specific applications (having a profile for the consumer 112, etc.), which provide an input to the vehicle 116 based on one or more trigger conditions (e.g., based on the vehicle being within proximity of a restaurant at which the consumer 112 frequently dines, etc.) thereby identifying the interest for the consumer 112. In particular, and without limitation, the merchant-specific application may be associated with a pharmacy merchant, where when the application indicates that a prescription for the consumer 112 is ready at the merchant (as a trigger condition), the application communicates with the vehicle 116 to identify the prescription (and picking up the prescription) as an interest associated with the consumer 112.

In addition, or alternatively, the vehicle 116 may detect the consumer's interest in one or more of the following manners: based on different data from the vehicle 116, such as a low fuel level, a low tire pressure, a particular mileage indicative of a need for an oil change, etc.; based on one or more loyalty/rewards programs associated with the consumer 112; based on preprogrammed triggers or rules provided by the consumer 112 to the vehicle (e.g., via a network-based application at the vehicle 116, at the consumer's smartphone/tablet, etc.), such as identifying merchants within a particular distance of the consumer 112 at which one or more products on the consumer's shopping list can be purchased, etc.; based on contextual information associated with the vehicle 116, such as recommending a hotel when a travel time between a current location of the vehicle 116 and a location programmed into a GPS system of the vehicle 116 is more than twelve hours or, in the same scenario, when the current time reaches a particular time in the evening (e.g., 9:00 PM, etc.). Further, the decision engine 120 may detect an interest associated with the consumer 112 in a variety of additional manners including, for example, based on the different trigger conditions described in the example scenarios below (e.g., based on the consumer's travel from home to work (or vice-versa), the consumer's selection of a rental vehicle, the time of day, the vehicle's gasoline level, etc.). Moreover, and as generally described above, the consumer's detected interest may also be based on prior transactions with the merchant 102 (or with other merchants), particular consumer inputs, and/or predefined consumer preferences, etc.

In any case, upon detection of an interest for the consumer 112, the vehicle 116 provides the interest to the decision engine 120 (wherever the decision engine 120 is located). In response, the decision engine 120 identifies, at 304, one or more relevant merchants for the consumer 112 based on the interest. For example, when the consumer's interest includes coffee, the decision engine 120 identifies coffee merchants within a particular distance of the current location of the vehicle 116 (e.g., within one mile, etc.). In addition, at 304, the decision engine 120 requests sales data from the identified merchant(s), for example, merchant 102 in the following, relating to the consumer's interest. In connection therewith, the request may include, for example, an identification of a particular product at the merchant 102 (e.g., coffee, etc.), or a general request for sales data (e.g., depending on the product offerings of the merchant 102, etc.). As shown, the merchant 102 then responds, at 306, with the sales data for the identified product. As described above, the sales data may include, for example, product names, product descriptions, images, pricing, etc.

In response, the decision engine 120 passes the sales data to the vehicle 116, at 308. In turn, the vehicle 116 (or the decision engine 120, depending on location (e.g., when located at the vehicle 116, etc.)) displays (or causes to be displayed), at 310, at least a portion of the sales data to the consumer 112. For example, the vehicle 116 may display a series of interfaces at an output device 206 of the vehicle 116, whereupon the consumer 112 is able to browse the products included in the sales data, and ultimately select, at 312, one of the products, if desired. The selection (broadly, a user input) is recognized by the vehicle 116 and provided, by the vehicle 116, to the decision engine 120.

With continued reference to FIG. 3, in response to a selection of a product from the sales data by the consumer 112, the decision engine 120 creates an order object for purchase of the product, at 314 (i.e., for the selected product). The order object includes, for example, the name of the product, a description of the product, a name of the merchant (e.g., the merchant 102, etc.), a price for the product, etc. At 316, the decision engine 120 requests a vehicle signature from the vehicle 116, in which (or at which) the product was selected. In response, the vehicle 116 transmits the vehicle signature to the decision engine 120, at 318. If the vehicle signature is a static vehicle signature, for example, the vehicle 116 is able to simply retrieve the vehicle signature from memory (if previously determined) and transmit the vehicle signature to the decision engine 120. Conversely, if the vehicle signature is dynamic, the vehicle 116 generates the vehicle signature, at 320 (e.g., computes an indicator associated with the vehicle 116 based on the VIN, etc.), and then transmits the generated vehicle signature to the decision engine 120 at 318. When the vehicle signature is a vibration and/or sound associated with the motor of the vehicle 116, for example, the vehicle 116 may generate the vehicle signature by recording the vibration and/or sound associated with the motor, by the input device 206 of the vehicle 116, etc. Regardless of form, upon receipt of the vehicle signature, the decision engine 120 appends, at 322, the vehicle signature to the order object. In one or more embodiments, prior to appending the vehicle signature, the decision engine 120 may further authenticate/verify the vehicle signature based on a reference vehicle signature for the vehicle 116, for example, stored in memory 204 in association with the decision engine 120 (or retrieved, by the decision engine 120, from elsewhere). When the received vehicle signature matches, or sufficiently matches the reference vehicle signature, the vehicle signature is authenticated/verified, and the decision engine 120 then appends the vehicle signature, at 322, to the order object. In at least one embodiment, the decision engine 120 may then store the received vehicle signature in memory 204 as a new reference vehicle signature, in place of the prior reference vehicle signature (thereby updating/refreshing the reference vehicle signature for the vehicle 116).

As part of authenticating/verifying the vehicle signature in connection with appending the vehicle signature to the order object, the matching of the received vehicle signature to the reference vehicle signature may be based on acceptable variances for the vehicle signature (depending on the form of the vehicle signature), and on a product of a frequency at which the reference vehicle signature is received/refreshed. For example, when the vehicle signature comprises the VIN for the vehicle 116, an exact match may be required to authenticate/verify the vehicle signature (regardless of when the reference vehicle signature was obtained). However, when the vehicle signature comprises a mileage of the vehicle, a match (or sufficient match) of the received vehicle signature to the reference vehicle signature may be based on when the reference vehicle signature was obtained and on an acceptable deviation and/or tolerance, such as, for example, an expected change in such mileage up to a present time (e.g., based on average driving habits for motorists, etc.). Or, when the vehicle signature comprises a sound/vibration profile for the vehicle 116, a match or, more specifically, a sufficient match of the received vehicle signature to the reference vehicle signature may be based on when the reference vehicle signature was obtained (e.g., date, time of year, location, etc.) and/or one or more acceptable deviations and/or tolerances in sound matches generally known to and/or followed by those of ordinary skill in the art of matching different sounds.

Separately in the method 300, following the selection of the particular product by the consumer 112 from the sales data for the merchant 102, at 312, the product selection is also provided to the transaction engine 122 (e.g., by the vehicle 116 and/or the decision engine 120, etc.). In response, the transaction engine 122 authenticates the consumer, at 324. Such authentication may include, for example, the transaction engine 122 causing a personal identification number (PIN) to be solicited from the consumer 112 at the consumer's smartphone/tablet (e.g., "Please Enter Your PIN.", etc.) or at the vehicle 116. When the consumer 112 enters his/her PIN in response, the transaction engine 122 confirms the PIN, and then authenticates the consumer 112. It should be appreciated that the consumer 112 may be authenticated through one or more additional, or alternative, scenarios within the scope of the present disclosure (e.g., via biometrics, etc.).

At 326, the transaction engine 122 then creates a transaction object for the selected product (and, more specifically, for a potential payment account transaction for the selected product). The transaction object includes, without limitation, an amount of the payment account transaction for the product (e.g., based on a price of the selected product, sales tax, etc.), an identification of the merchant 102 and/or the acquirer 104 associated with the merchant 102 from which the product is to be purchased, payment account credentials for the consumer 112 (e.g., as received/retrieved from the consumer 112 and/or from a network-based wallet application associated with the consumer 112, etc.), etc. In connection therewith, the transaction engine 122 also requests a vehicle signature from the vehicle 116 (or decision engine 120 therein), at 328, for inclusion in the transaction object. As above, the vehicle 116 transmits the vehicle signature, at 318, to the transaction engine 122. Again, however, if needed, the vehicle 116 also generates the vehicle signature, at 320, in connection therewith. Then, once the vehicle signature is received, the transaction engine 122 appends, at 330, the vehicle signature to the order object. In one or more embodiments, prior to appending the vehicle signature, the transaction engine 122 may further authenticate/verify the vehicle signature based on a reference vehicle signature for the vehicle 116, for example, stored in memory 204 in association with the transaction engine 122. When the received vehicle signature matches, or sufficiently matches (as described above) the reference vehicle signature, the vehicle signature is authenticated/verified, and the transaction engine 122 then appends the vehicle signature to the transaction object, at 330. In addition, in various embodiments, the transaction engine 122 may then store the received vehicle signature in memory 204 as a new reference vehicle signature, in place of the prior reference vehicle signature (thereby updating/refreshing the reference vehicle signature for the vehicle 116).

With that said, it should be appreciated that the requests for the vehicle signature from the decision engine 120 and the transaction engine 122 will generally be in close proximity to one another. Based thereon, and on the desire for the vehicle signatures to match, when the vehicle signature is dynamic, the vehicle 116 may generate only one vehicle signature in a defined interval (e.g., one vehicle signature every minute, every five minutes, every 30 minutes, etc.), thereby improving the likelihood that the same vehicle signature (even when dynamic) is transmitted to both the decision engine 120 and the transaction engine 122.

Next in the method 300, the transaction engine 122 transmits the transaction object to the decision engine 120 for matching. It should be appreciated, however, that in other embodiments the decision engine 120 may instead transmit the order object to the transaction engine 122 for matching. In any case, in turn, the decision engine 120 matches, at 332, the order object and the transaction object based on the vehicle signature included in the objects. When a match is found, the decision engine 120 compiles a purchase order for the selected product (based on information in the order object and the transaction object) and transmits, at 334, the purchase order to the merchant 102. The purchase order includes all of the required and/or desired information for the merchant 102 to potentially authenticate/verify the purchase order and initiate a payment account transaction for the product, including, without limitation, an identification of the product, consumer contact information, payment account credentials for the consumer's payment account, the vehicle signature for the vehicle 116, etc. Then, at 336, the merchant 102 receives the purchase order and processes the order. In doing so, the merchant 102 authenticates/verifies the vehicle signature included in the purchase order based on a reference vehicle signature for the vehicle 116, for example, stored in memory 204 in the computing device 200 associated with the merchant 102 (or retrieved from the decision engine 120 (e.g., at the payment network 106, etc.)). When the vehicle signature in the purchase order matches, or sufficiently matches (as described above) the reference vehicle signature, the vehicle signature is authenticated/verified and the merchant 102 causes an authorization request for the purchase of the selected product to be transmitted to the issuer 108 of the consumer's payment account, as described above in the system 100 (and with reference to path A in FIG. 1). And, the merchant 102 further provides for delivery of the product to the consumer 112 consistent with one or more directions included in the purchase order, as conventional, or otherwise (e.g., as otherwise described herein, etc.). In one or more embodiments, the merchant 102 also stores the vehicle signature in association with the purchase order (e.g., in memory 204, etc.) and then later, authenticates/verifies the vehicle 116, by the vehicle signature, in connection with delivery of the product(s). Consistent with the above, the specific manner in which the merchant 102 receives and/or captures the vehicle signature at delivery and then matches (or sufficiently matches) the stored vehicle signature may vary based on the type of vehicle signature stored.

Apart from, or in addition to, the above, the systems and methods herein may extend to the further configurations and/or operations described below, for use of vehicles, vehicle signatures, and/or vehicle connectivity to facilitate payment account transactions.

In one example, the vehicle 116 (specifically, the decision engine 120, incorporated into the vehicle 116, for example) detects one or more interests of the consumer 112 in gasoline, for example, based on a low gasoline level in the vehicle 116 and/or the vehicle's location at a gasoline merchant (e.g., a gas station, etc.). The vehicle 116 identifies one or more relevant merchants (e.g., the merchant 102) (e.g., based on a loyalty/rewards account associated with the consumer 112 and/or the vehicle signature for the vehicle 116, transaction history, location, etc.) and then communicates with the merchant 102 to solicit sales data, as described above, such as a price of gasoline, sales tax, etc., and permission for gasoline to be dispensed to the vehicle 116 when the vehicle 116 is present at the gasoline pump device (e.g., based on GPS, Bluetooth communication, etc.) (e.g., when recognized by the vehicle signature, or when authenticated by the vehicle signature, or otherwise, etc.). In another example, the merchant 102 may include a fast food merchant, whereupon when the vehicle 116 is proximate to the merchant 102, or in route to the merchant 102, around an eating time (e.g., midday, evening, etc.), the vehicle 116 detects the interest of the consumer 112 in the fast food merchant 102 (e.g., based on a predetermined preference of the consumer 112 for the merchant 102 from the consumer's transaction history, user profile, etc.). The vehicle 116 then communicates with the fast food merchant 102 to solicit sales data, such as, for example, menus, prices, sales tax, etc. (as described above). The sales data is then displayed to the consumer 112, at the vehicle 116, to permit selection of menu items (e.g., from an input device 208 within the vehicle 116, etc.), potentially resulting in a purchase order to the merchant 102 (e.g., directly, or via the decision engine 120 apart from the vehicle 116, etc.), again, as described above. With that said, in connection with the above examples, it should be appreciated that a variety of different interactions may take place, and may be made available, between the vehicle 116, the decision engine 120 (when included or not included in the vehicle 116), and the merchant 102, often depending on a type of the merchant 102, products offered for sale by the merchant 102, a physical setup/location of the merchant 102, and/or an ability to detect a consumer interest in the merchant 102 (or other merchant(s)) and/or one or more products offered by the merchant(s), etc.

In another example, when the consumer 112 is near or in the vehicle 116 and at least one of the payment devices 114 is also present near or in the vehicle 116, the particular payment device 114 and/or the vehicle 116 may communicate with (or allow communication therewith by) the decision engine 120 (apart from the vehicle 116, or incorporated therein). As part of the communication with the consumer's payment devices 114, for example, and in connection with a desired transaction by the consumer 112 at the merchant 102, the decision engine 120 may access and/or acquire payment credentials from one or more of the payment devices 114. The decision engine 120 (e.g., incorporated in the vehicle 116, etc.) may be permitted to do so by providing the vehicle signature to the payment device 114, or otherwise authenticating itself to the payment device 114, whereby the payment device 114 (or the decision engine 120) matches the vehicle signature to a reference vehicle signature, etc. Then, at the consumer's instruction, or by the vehicle's location in proximity to the merchant 102, the vehicle 116, and in particular, the engine 120, is able to cause the payment credentials to be provided to the merchant 102 (e.g., to a POS terminal associated with the merchant 102, etc.) in connection with the desired transaction (e.g., directly via NFC, Bluetooth, RFID, etc. when the consumer 112 is near the merchant 102 or within a particular range of the merchant 102; via the network 110; etc.). Furthermore, the vehicle 116 may serve as an authentication mechanism for the payment transaction. In particular, rather than, or in addition to, the vehicle 116 receiving payment credentials, the vehicle 116 may provide its vehicle signature to the payment device 114 and/or a POS terminal of the merchant 102. In doing so, a further form of authentication may be omitted. For example, gasoline pumps may require the consumer 112 to enter a postal code to permit a payment transaction. When the vehicle 116 provides a vehicle signature, which pairs with the payment device 114, that further authentication by the consumer 112 may be completed thereby, such that the entry of the postal code is omitted.

In yet another example, when the consumer's smartphone/tablet is available as one of the payment devices 114, and present in the vehicle 116, the decision engine 120 (included in the vehicle 116, or not) may automatically, or in response to an input, communicate with the smartphone/tablet (i.e., the network-based application associated therewith enabling the smartphone/table to be the payment device), to access and/or acquire payment credentials associated with the payment device 114 and/or to provide the product selected by the consumer 112, whereupon the smartphone/tablet (including, for example, transaction engine 122) is permitted to create the transaction object as described above. Again, this may be permitted in general, or potentially based on the payment device's receipt/detection of the vehicle signature from the vehicle 116 to authenticate the vehicle 116 and/or the consumer 112 (e.g., at operation 324 of FIG. 3, etc.). In still another example, when the consumer's key fob is available as one of the payment devices 114, the decision engine 120 may access or acquire payment credentials in the key fob, via a network interface 210, which may include an NFC device, or RFID device, and pass the credentials to the transaction engine 122, for use as described herein. Further, the vehicle 116 may communicate with the key fob payment device 114, via input devices and/or network devices. Specifically, with respect to the consumer's key fob, the decision engine 120 (included in the vehicle 116) may, only when the key fob is inserted into the ignition of the vehicle 116 and/or the key fob is positioned sufficiently to enable ignition of the vehicle 116, access and/or acquire the payment credentials for the key fob.

As another example, the decision engine 120, installed in the vehicle 116, for example, may be configured to identify that at 7:30 AM John Smith, when departing his residence on a Monday, is in route to work, and then further to identify one or more likely routes for John Smith to work. Next, the decision engine 120 (or an application in communication with the decision engine 120) may combine the intuitive parameter that John Smith is traveling to work with the contextual parameter of John Smith's likely route to work, and detect products and/or merchants of interest to John Smith (e.g., a cup of coffee at merchant 102, etc.). The detected interest of John Smith (i.e., the consumer 112) may then trigger method 300, for example. Further, the detected interest, when combined with the vehicle signature to identify the vehicle 116 (e.g., to detect the vehicle 116 is nearby, etc.), may further cause advertising content to be delivered to John Smith in the vehicle 116 (visually or audibly), for example, at the advertising media 118, etc.

Then, after work, the consumer 112 may drive to a restaurant for dinner prior to going home. However, on his/her way to the restaurant, the vehicle 116 (via the decision engine 120 and/or another application associated with or installed therein) may indicate to the consumer 112 that gasoline is needed to travel to the restaurant (that the gasoline needed to travel the distance to the restaurant exceeds the available gasoline in the vehicle 116), thereby detecting a consumer interest for gasoline. In turn, the decision engine 120 may identify a gas station merchant along the consumer's route to the restaurant and communicate with the gas station merchant to retrieve sales data and/or facilitate a payment account transaction for gasoline at a gasoline pump device at the gas station merchant (which is then ready to pump when the consumer 112 arrives). In connection therewith, the decision engine 120 may also cause vehicle-related messages to be displayed to the consumer 112, at the output device 206 of the vehicle 116 or the output device 206 of the pump device (e.g., maintenance due, tire pressure warning, etc.) and schedule maintenance for the vehicle 116 and pre-pay for such maintenance, as needed. After stopping for fuel, the consumer 112 may be late in arriving to the restaurant. As such, the consumer 112 may provide input to the engine 120 to order and pay for a desired meal at the restaurant, even though the consumer 112 is not yet present.

In another example, the vehicle 116 may include a rental vehicle (or other ride-share vehicle) provided to the consumer 112 while traveling for work. In connection therewith, the decision engine 120, at the vehicle 116, may perform various ones of the operations described herein, in connection with the consumer's work travel.

For example, when traveling for work, the consumer 112 may initially fly to a work destination early in the morning. Upon arrival at the destination airport, the consumer 112 may rent the vehicle 116. Upon rental of the vehicle 116, the vehicle signature for the vehicle 116 may be associated with the consumer's payment account (for use as described in FIG. 3, for example), or may be associated with a payment account associated with the rental merchant, or a still other payment account.

Once in the vehicle 116, the consumer 112 may drive to a business meeting at a business location. While in route, the decision engine 120, recognizing that it is morning time, may detect a potential interest of the consumer 112 to purchase coffee/breakfast. The detected interest of the consumer 112 may then trigger method 300, for example, whereby the vehicle signature is used in an order object by the decision engine 120 (based on the consumer's selection) and a transaction object by the transaction engine 122, notwithstanding the vehicle 116 being a rental vehicle, so that the coffee/breakfast is ready when the consumer 112 reaches the selected merchant and the consumer 112 can simply pick it up (e.g., curbside, etc.). As the consumer 112 travels to the business location, he/she may travel through various toll booths. Upon approaching the toll booths, the decision engine 120 may interact with one of the consumer's payment devices 114 and/or the transaction engine 122 to effect payment, through the consumer's payment account, or the rental merchant's payment account, based on the vehicle signature of the vehicle 116 (again, as described above). The vehicle signature may be emitted by the vehicle 116 (e.g., motor sound/vibration, etc.) and captured by the toll booth (not shown), or may be transmitted, for example, via NFC communication with the toll booths, etc. In addition, as the consumer 112 (and the vehicle 116) nears the business location, the decision engine 120 may also identify an interest in parking, thereby again triggering the method 300, for example. The vehicle signature, in addition to its use in method 300, may also be employed by the parking merchant to assign and/or verify a parking spot within a parking lot.

When the consumer's business meeting is complete, the consumer 112 uses the vehicle 116 to travel back to the airport. However, on his/her way to the airport, the vehicle 116 may detect that gasoline is needed prior to returning the vehicle 116 to the rental merchant at the airport, thereby manifesting an interest of the consumer 112 in a gasoline merchant. In turn, consistent with method 300, the decision engine 120 may identify a gas station merchant along the consumer's route to the airport, which is designated by the rental merchant (e.g., pursuant to a loyalty/reward program between the rental merchant and the gas station merchant, etc.), whereby the rental merchant's payment account is identified by the vehicle signature and used to purchase gasoline (i.e., the consumer's payment account is not). The consumer 112 may, in turn, pay separately for the gasoline at the rental merchant, via a separate payment account transaction (e.g., along with the bill for the rental, etc.). In at least one embodiment, the vehicle signature is detected at the gasoline merchant, which is then linked to the consumer's payment account by the rental merchant, so that the original transaction for gasoline is ultimately directed to the consumer's payment account.

In still another example, the consumer 112 and his/her family may use the vehicle 116 to take a family vacation to a vacation destination. In connection therewith, the decision engine 120, when incorporated in the vehicle 116, may perform various ones of the operations described herein, in connection with the travel by the consumer 112 and his/her family.

Moreover, in such an example, the vehicle 116 may include a driverless vehicle (or, alternatively, a driver-assisted vehicle), whereby at least a portion of the driving decisions and/or actions made by the vehicle 116 are directed by the vehicle 116 rather than the consumer 112. As such, the consumer 112 may initially drive the vehicle to an interstate in route to the vacation destination, and then activate the driverless capabilities of the vehicle 116 such that the vehicle 116 then makes driving decisions to route the vehicle 116 to the vacation destination. At that time, the consumer 112 and/or other members of his/her family may activate a network-based application, and browse products at the output device 206 of the vehicle (e.g., a windshield HUD, etc.). In response, the consumer 112 can provide input to the vehicle 116 (specifically, to the decision engine 120), via input device 208, thereby expressing a consumer interest in a product and/or merchant, and then selecting an associated product(s) (based on provided sales data), thereby triggering the method 300, for example.

In particular, as the consumer 112 (and vehicle 116) travel toward the vacation destination, the consumer 112 (or other member of his/her family) may realize they forgot to pack certain clothing needed at the vacation destination. In response, the consumer 112 express an interest in a product of the type forgotten, potentially triggering method 300, for example, or other payment account transaction via the vehicle 116. Additionally, or alternatively, as the vehicle 116 continues to travel, it approaches the advertising media 118, which (via an engine 120) communicates with the decision engine 120 at the vehicle 116 and displays advertising content for a merchant, located along the consumer's travel route, that may have the forgotten product. The consumer 112 can provide input to the vehicle 116 (specifically, to the decision engine 120), via input device 208, which would also indicate the consumer's interest in the product, thereby potentially triggering method 300, for example, or other payment account transaction via the vehicle 116. In addition, the consumer 112 and his/her family may desire to stop to eat dinner as they travel. The consumer 112 may provide a voice command input to the decision engine 120 expressing an interest in dinner locations along their route, based on a desired cuisine. The decision engine 120, as described above, identifies related merchants, again, consistent with method 300, for example, and provides various sales data to the consumer 112 for such merchants (from which the merchant selects a desired product, for example, via method 300). After dinner, the vehicle 116 (via the engine 120) may indicate to the consumer 112 that gasoline is needed, thereby again indicating a consumer's interest in gasoline (in a similar manner to that described above).

As the consumer 112 approaches his/her hotel, the decision engine 120 may detect an interest in hotel accommodations (e.g., based on the location, time of day, etc.) and, consistent with the exemplary method 300, or other payment account transactions via the vehicle 116, transmit a purchase order for the consumer 112 and his/her family for the rooms. In addition, the decision engine 120 may receive key credentials for the rooms on one or more of the consumer's payment devices 114. As such, the consumer 112 and his/her family can go straight to their rooms upon arrival at the hotel. Upon further travel, in this example, the vehicle 116 may have a flat tire, thereby indicating a consumer interest in a tow truck and/or tire repair merchant. Additionally, or alternately, the consumer may express an interest, to the decision engine 120, for a ride share application (e.g., Uber® application, etc.), when the tow trick is too far from the present location of the vehicle 116. The consumer's interest may then trigger method 300, for example, or other payment account transaction via the vehicle 116.

As can be seen, the decision engine 120 herein, in several embodiments, is consumer configurable and/or vehicle configurable. In particular, for example, when the vehicle 116 is a multi-consumer vehicle (e.g., family vehicles, shared vehicles, corporate vehicles, rental car, etc.), the decision engine 120, by detecting, accessing, or acquiring a payment credential, may be configured to load and rely on a consumer profile associated with the payment credential and/or payment account. The vehicle 116 may include multiple profiles for consumers who frequently use the vehicle 116. Alternatively, or additionally, the vehicle 116, and in particular, the decision engine 120, may retrieve the consumer profile, based on the payment credential, from companion decision engine 120 located at the payment network 106, the payment device 114, or another party associated with and/or included in the system 100. In one example, the consumer 112, through use of the vehicle 116, causes a consumer profile to be generated, based on prior history (e.g., payment history, travel history, etc.). When the consumer 112 rents the vehicle 116, the consumer's profile may be accessible to and used by the decision engine 120 installed in the vehicle 116, to perform as described herein. For example, at 7:30 AM in the rental vehicle 116, the decision engine 120 may cause advertising content related to coffee to be displayed to the consumer 112, even when away from his personal vehicle and usual coffee shops. The link of the consumer profile may be accomplished by one of the consumer's payment devices 114, such as the consumers' key fob, smartphone/tablet, etc., accessible by both the consumer's usual vehicle and the rental vehicle 116, in this example.

Further, and as described above, the decision engine 120 and/or the transaction engine 122 may be employed to pay tolls, through use of the payment credential(s), associated with one or more of the payment devices 114, regardless of whether the consumer 112 is present within his/her vehicle 116 or a rental vehicle 116. Likewise, the decision engine 120 and/or the transaction engine 122 may be configured to pay for parking using the credential(s), accessed by the decision engine 120 and/or the transaction engine 122, from one or more of the payment devices 114.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) in response to a detected interest of a consumer, requesting sales data associated with the consumer interest from at least one merchant based on a location of a vehicle associated with the consumer; (b) creating an order object for a product selected from the sales data; (c) appending a vehicle signature, for the vehicle, to the order object; (d) matching the order object to a transaction object for the selected product based on the vehicle signature; and (e) transmitting a purchase order to the at least one merchant based on the order object and the transaction object, thereby permitting the at least one merchant to facilitate a payment account transaction for the selected product.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Although the terms first, second, third, etc. may be used herein to describe various elements and operations, these elements and operations should not be limited by these terms. These terms may be only used to distinguish one element or operation from another element or operation. Terms such as "first," "second," and other numerical terms when used herein do not imply a sequence or order unless clearly indicated by the context. Thus, a first element operation could be termed a second element or operation without departing from the teachings of the exemplary embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for utilizing vehicle connectivity to facilitate payment account transactions, the method comprising:
in response to a detected interest of a consumer, requesting, by a computing device, sales data associated with the consumer interest from at least one merchant based on a location of a vehicle associated with the consumer;
creating an order object for a product selected from the sales data;

appending, by the computing device, a vehicle signature, for the vehicle, to the order object, the vehicle signature based on a condition of the vehicle;

matching, by the computing device, the order object to a transaction object for the selected product based on the vehicle signature; and in response to the matching, transmitting, by the computing device, a purchase order to the at least one merchant based on the order object and the transaction object, thereby permitting the at least one merchant to facilitate a payment account transaction for the selected product.

2. The computer-implemented method of claim 1, further comprising detecting, by the vehicle, the interest of the consumer in at least one product based on at least one of a transaction history associated with the consumer and a location of the vehicle.

3. The computer-implemented method of claim 1, further comprising passing, by the computing device, the sales data from the at least one merchant to the vehicle, such that the vehicle is able to display at least a portion of the sales data to the consumer; and receiving, at the computing device, a selection of the product prior to creating an order object for the selected product.

4. The computer-implemented method of claim 1, wherein creating the order object includes appending at least a portion of the sales data associated with the selected product to the order object.

5. The computer-implemented method of claim 1, further comprising requesting, by the computing device, the vehicle signature from the vehicle; and receiving, by the computing device, the vehicle signature from the vehicle prior to appending the vehicle signature to the order object.

6. The computer-implemented method of claim 1, wherein the vehicle signature includes the condition of the vehicle modified by an operator, whereby the vehicle signature is distinct from the condition of the vehicle.

7. The computer-implemented method of claim 5, further comprising transmitting, by the vehicle, the vehicle signature to the computing device in response to the request for the vehicle signature by the computing device.

8. The computer-implemented method of claim 1, wherein the vehicle includes the computing device; and further comprising:

displaying at least a portion of the sales data to the consumer; and generating, by the computing device, the vehicle signature for the vehicle.

9. The computer-implemented method of claim 1, further comprising:

compiling the transaction object for the selected product;
requesting the vehicle signature from the vehicle; and
appending the vehicle signature for the vehicle to the order object.

10. The computer-implemented method of claim 6, wherein the operator includes at least one of a shift function, a multiplier, and a token.

11. A system for facilitating payment account transactions, through vehicle connectivity, the system comprising:

at least one server for communicating with at least one vehicle;

wherein the at least one server includes at least one decision engine, which configures the at least one server to:

identify at least one merchant based on a location of the at least one vehicle;

request sales data from the at least one merchant for a product of interest to a consumer;

receive and pass the sales data from the at least one merchant to the at least one vehicle;

create an order object for the product, in response to a user input from the at least one vehicle; and request a vehicle signature associated with the at least one vehicle and append the vehicle signature to the order object, wherein the vehicle signature is based on a vehicle identifier modified by an operator and is distinct from the vehicle identifier;

wherein the at least one server further includes a payment engine, which configures the at least one server to:

create a transaction object for a transaction for the product to a payment account associated with the consumer; and request a vehicle signature associated with the at least one vehicle and append the vehicle signature to the transaction object;

wherein the at least one decision engine further configures the at least one server to transmit a purchase order to the at least one merchant in response to the vehicle signature in the order object matching the vehicle signature in the transaction object, thereby permitting the at least one merchant to facilitate a payment account transaction for the selected product.

12. The system of claim 11, wherein the vehicle identifier includes a vehicle identification number (VIN) and/or a license plate number of the at least one vehicle.

13. The system of claim 11, wherein the at least one decision engine configures the at least one server to detect the product of interest based on a location of the at least one vehicle and/or transaction history associated with said payment account.

14. The system of claim 11, further comprising a non-transitory computer readable storage media including executable instructions to enable communication between the at least one server and the at least one vehicle, which, when executed by at least one processor of the at least one vehicle, causes the at least one processor to:

generate the vehicle signature;

transmit the vehicle signature to the at least one server in response to the at least one server requesting the vehicle signature; and transmit the vehicle signature to the at least one server in response to the at least one server requesting the vehicle signature.

15. The system of claim 14, wherein the executable instructions, when executed by the at least one processor of the at least one vehicle, further cause the at least one processor to:

receive the sales data from the at least one server; and
display at least a portion of the sales data to the consumer, at the at least one vehicle, thereby permitting the consumer to select the product of interest for purchase.

16. The system of claim 11, further comprising a payment network including the at least one server; and wherein the payment engine is associated with a network-based wallet application.

* * * * *